H. F. HITNER.

MOTOR CAR DRIVE SYSTEM.

APPLICATION FILED JAN. 26, 1916.

Reissued Apr. 25, 1916.

14,120.

2 SHEETS—SHEET 1.

Witnesses:

Albin C. Ahlberg

Robert F. Brock

Inventor

Harry F. Hitner

By Williams & Bradbury

Attorneys

H. F. HITNER.

MOTOR CAR DRIVE SYSTEM.

APPLICATION FILED JAN. 26, 1916.

Reissued Apr. 25, 1916.

14,120.

2 SHEETS—SHEET 2.

Witnesses:
Albin C. Ahlberg.
Robert F. Bracke

Inventor
Harry F. Hitner
By Williams & Bradbury
Attorneys

UNITED STATES PATENT OFFICE.

HARRY F. HITNER, OF MOUNT VERNON, OHIO.

MOTOR-CAR DRIVE SYSTEM.

14,120. Specification of Reissued Letters Patent. Reissued Apr. 25, 1916.

Original No. 1,139,678, dated May 18, 1915, Serial No. 800,034. Application for reissue filed January 26, 1916. Serial No. 74,484.

*To all whom it may concern:*

Be it known that I, HARRY F. HITNER, a citizen of the United States, residing at Mount Vernon, in the county of Knox and State of Ohio, have invented certain new and useful Improvements in Motor-Car Drive Systems, of which the following is a specification.

The invention relates to mixed drives for automobiles wherein a prime mover such as a gas engine is used in conjunction with a storage battery and a motor dynamo. The invention has for its primary objects; the provision of a mixed drive of simple arrangement; the provision of a mixed drive which may be easily operated by two shifting members or handles one of which is the controller handle and the other of which is the main operating lever; and the provision of a mixed drive which gives a positive control of the movements of the car and wherein the liability to injury through mishandling is reduced to a minimum. One embodiment of the invention is shown in the accompanying drawing, wherein—

Figures 1, 2:
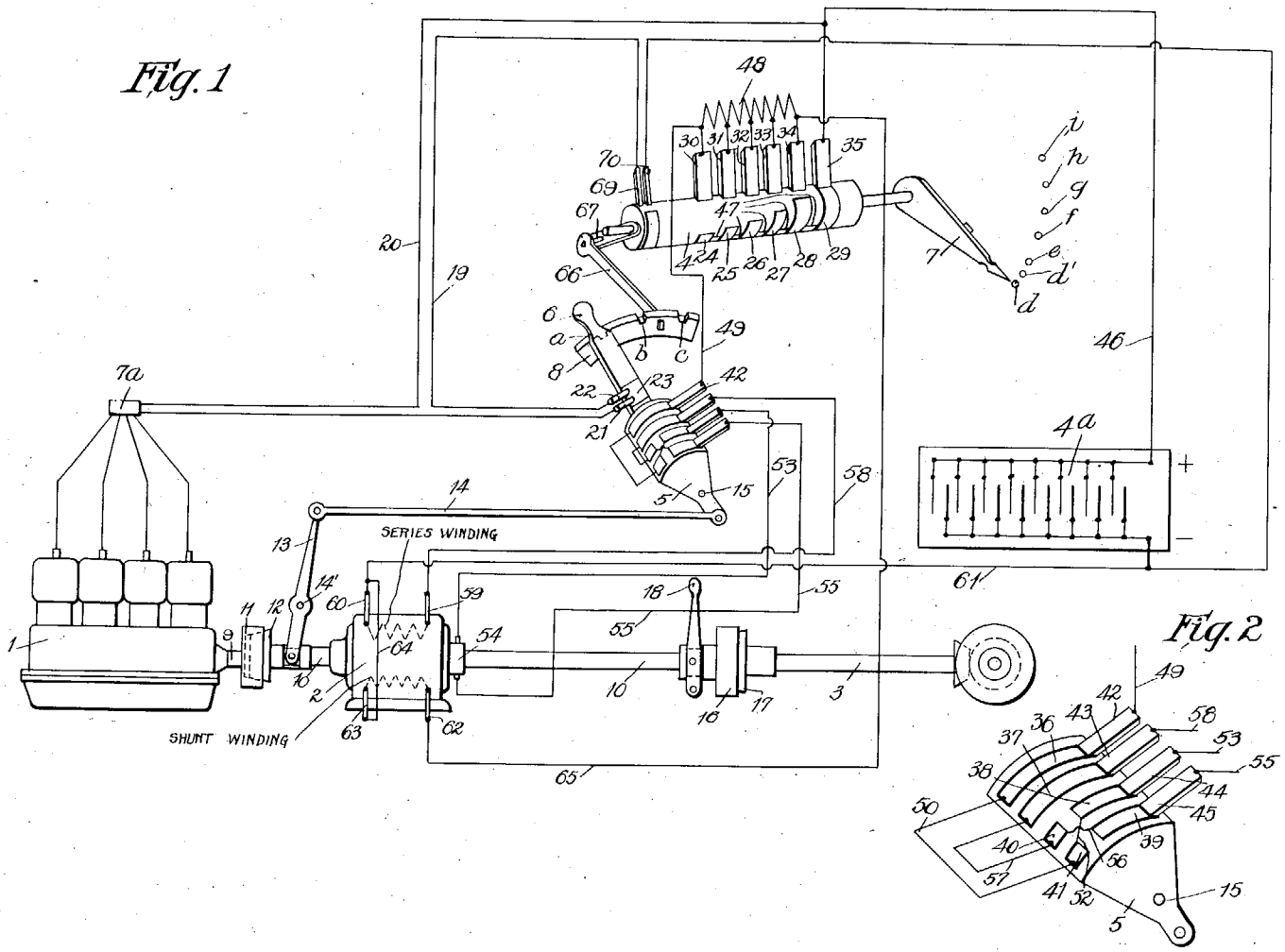
Figure 3:
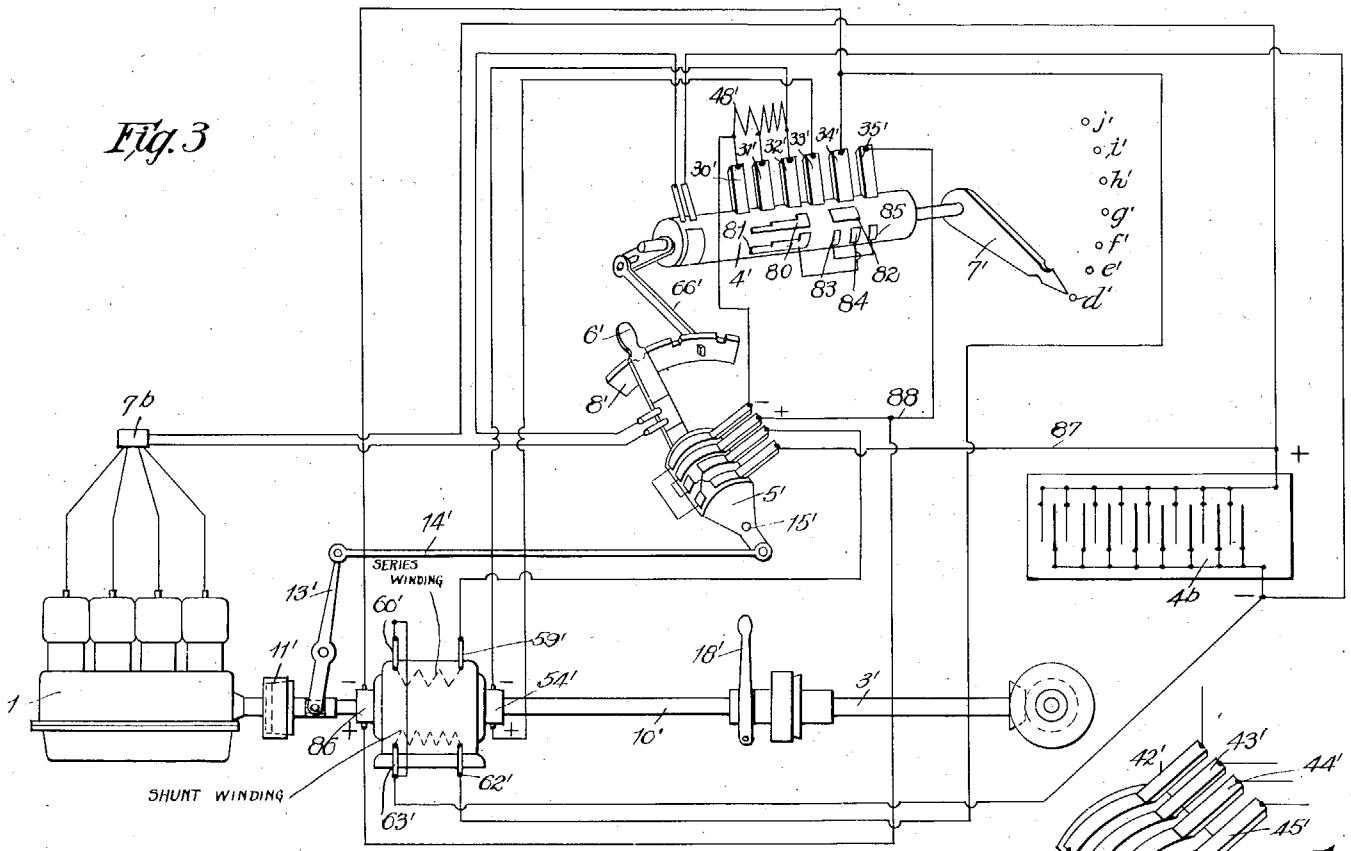
Figure 4:
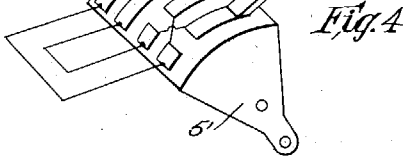

Figure 1 is a diagrammatic view showing the general arrangement of the entire system, and Fig. 2 is a detail sectional view on an enlarged scale, of the switch block, and Figs. 3 and 4 are diagrammatic views illustrating a modification.

In the construction as illustrated, 1 is an explosion engine which may be of any approved type; 2 is a motor dynamo having a compound wound field with a predominating shunt winding; 3 is a drive shaft connected to drive the wheels of the car in any desired manner; $4^a$ is a storage battery arranged in circuit with the series winding of the motor dynamo 2; 4 is a switch or controller drum operated by the handle 7 and adapted to control the supply of current from the battery to the motor dynamo; 5 is an oscillatory switch block whose movement serves to operate the engine clutch as hereinafter set forth; 6 is the handle for shifting the switch block 5; and $7^a$ is an igniter distributer in circuit with the storage battery $4^a$ when the handle 6 is in the position illustrated.

In the particular embodiment of the invention illustrated the handle 6 has three operative positions opposite the notches in the segment 8, such positions being indicated by the letters *a*, *b*, and *c*. When the handle is in the position *a* as illustrated the engine and motor are both in driving engagement with the shaft 3. When the handle is moved to the position *b* the motor still remains in driving engagement with the shaft 3, but the engine 1 is thrown out of connection, so that the car has only the electric drive, the various speeds being regulated by the position of the controller handle 7. When the handle 6 reaches the position *c* the engine is still out of driving engagement with the shaft 3, and the direction of current through the motor armature is reversed, so that the car runs backward under the control of the controller 4. The windings of the motor dynamo are such that when the car is driven above a certain speed by the engine 1, or is descending a hill at such relatively high speed, the motor becomes a dynamo and serves to charge the battery 4. When additional power is necessary to assist the engine as in hill climbing, the flow of current from the battery may be employed to drive the motor 2 and so give the additional power necessary.

The engine shaft 9 is coupled to the motor shaft 10 by means of the clutch members 11 and 12, the member 12 being splined on the shaft 10 and being operable by the lever 13 pivoted at the point 14′.

The upper end of the lever 13 is connected to the switch block 5 by means of the connecting rod 14, the switch block being pivoted at 15. When the handle 6 is in the position illustrated the clutch members 11 and 12 are in driving engagement, and the shaft 10 drives the shaft 3 by means of the clutch members 16 and 17 normally held in engagement, but manually operable by means of the lever 18. At this time the igniter distributer $7^a$ is in circuit with the battery $4^a$ by reason of the wires 19 and 20 and the contacts 21 and 22 which both make engagement with the metallic plate 23 carried by the handle 6.

At this time and with the controller handle 7 in the position *d* as illustrated, the motor and the ignition circuits are broken as it is desirable to control the engine and the motor by the same operating lever. That this is the case will be readily seen by reference to the controller drum 4 and the switch block 5 with their various contact plates and fingers. The drum 4 has the contact plates 24, 25, 26, 27, 28, and 29, of various lengths as illustrated, adapted to contact with the fingers 30, 31, 32, 33, 34, and 35, when the drum is rotated the necessary amount. The switch block 5 is provided with the contact plates 36, 37, 38, 39, 40, and 41 adapted to contact with the fingers 42, 43, 44, and 45 (see Fig. 2). The finger 35 is connected to the positive terminal of the battery 4ª by means of the wire 46, and this finger 35 contacts with the plate 29 on the drum, connected to the plate or strip 28 by means of the wire 47, but since the plate 28 is out of contact with the finger 34 the circuit is broken at this point, and no current can flow to the motor.

When the handle 7 is moved to the point *d'* the contact fingers 69 and 70 engage the control strip 71, thereby closing the ignition circuit, making it possible to start and operate the engine independently of the motor.

If, however, the handle 7 is moved to the position *e* the finger 34 contacts with the plate 38, and the motor circuit is completed. Starting again with the wire 46 this circuit includes the finger 35, plate 29, wire 47, plate 28, finger 34, resistance coils 48, wire 49, finger 42, plate 36, wire 50, plate 41, wire 52, plate 38, finger 44, wire 53, armature winding 54, wire 55, finger 45, plate 39, wire 56, plate 40, wire 57, plate 37, finger 43, wire 58, terminal 59 of the series winding, series winding of motor, terminal 60 of series winding, and wire 61 to the negative terminal of the battery 4ª. At this time all of the resistance is in the circuit and the power exerted by the motor is a minimum. As the controller handle 7 is shifted upward to the position *i* the amount of the resistance is decreased. For instance when the drum 4 is rotated to such a point that the plate 27 contacts with the finger 33 the resistance coils located at the right hand end of the series of coils 48 are cut out, and when the drum 4 reaches the position *i* with the plate 24 in contact with the finger 30 all of the resistance coils are cut out, the arrangement shown and described being, of course, a conventional one in so far as the controller is concerned.

In the position of the parts as just described, the motor supplements the driving action of the engine. If now the handle 6 is moved to the position *b* this condition is changed. The movement of the lever to the position *b* does not in anywise affect the circuits as heretofore described, since the fingers 42, 43, 44, and 45 still contact with the plates 36, 37, 38, and 39 respectively, but such movement causes the movement of the clutch member 12 to the right, so that the engine shaft is no longer in driving engagement with the shaft 3, and this movement of the handle also causes the disengagement of the plate 23 with the contacts 21 and 22, so that the igniter circuit is broken. While the handle or lever 6 is in this position *b* the engine 1 is therefore entirely out of operation and the drive of the car is purely electric, the speed desired being secured by shifting the controller handle 7. The shunt winding of the motor terminates at the posts 62 and 63, the post 63 being connected to the wire 61 by means of the wire 64, while the post 62 is connected to the series circuit at the right hand end of the resistance 48 by means of the wires 65.

When the handle 6 is shifted to the position *c* the fingers 44 and 45 are shifted from the plates 38 and 39 to the plates 40 and 41. Such shift secures a reversal of current flowing through the armature 54 and causes the motor to run backward, assuming, of course, that the controller handle 7 is in one of the positions *e*, *f*, *g*, *h*, or *i*. Starting with the wire 49, the circuit at this time is as follows: finger 42, plate 36, wire 50, plate 41, and finger 45, wire 55, armature 54, wire 53, finger 44, plate 40, wire 57, plate 37, finger 43, wire 58, terminal 59, series winding of motor, terminal 60, and wire 61. The current is thus reversed in direction through the armature, without reversing the direction of current through the field, so that the motor runs backward, the speed being dependent upon the position of the controller handle.

In order to prevent the shifting of the handle 6 from the position *b* to the position *c* when the motor circuit is complete, the locking bar 66 is provided working through a perforation in the segment 8. This bar 66 is provided at its upper end with a pin fitting a slot 67 in a lever 68 secured to the controller drum 4. When the controller handle 7 is in the position *d* the end of the bar 66 is flush with the front face of the segment 8, and the handle 6 is free to move from the position *b* to the position *c*, the motor circuit at such time being broken. If, however, the handle 7 is in the position *e* or any of the other positions thereabove, the end of the bar 66 projects beyond the front of the segment 8, and the handle 6 is prevented from moving from the position *b* to the position *c*. Danger of injuring the motor parts is thus avoided. In order to permit of the control of the igniter circuit by means of the controller 4 and independent of the operation of the handle 6 the contacts 69 and 70 are provided normally contacting with the plate 71 when the controller is in all positions but its neutral position *d*.

When in the position *d* the igniter circuit is interrupted.

Figs. 3 and 4 illustrate a modified construction showing the connections and the controller employed where a series multiple operation with a double commutator is used, the additional commutator winding being indicated by the reference numeral 86. The primed reference numerals and letters indicate parts which correspond to the unprimed reference numerals and letters in Fig. 1, and a description of these parts is therefore omitted. The battery $4^b$ and igniter distributer $7^b$ are the same in construction as the parts $4^a$ and $7^a$ in the construction of Fig. 1.

The primary distinctions in this structure as compared with that of Fig. 1 reside in the controller 4′, the modified connections, and the use of the additional commutator winding 86. The principle of operation throughout is precisely the same as that in Fig. 1, but the arrangement shown in Fig. 3 gives a greater variation in the speed of the electric motor, due to the fact that in the first three operative positions of the controller *e′*, *f′*, *g′*, the current is directed in series through the series winding and the two armature windings, thus giving relatively low speeds, while in the three positions *h′*, *i′*, and *j′* the distribution of the current is a multiple one, one portion of the current passing in series through the series winding of the motor and one of the armature windings, and in another position passing through the series winding and the other armature winding.

When the controller 4′ is in the position illustrated with the handle 7′ in the position *d′*, the supply of current to the motor is cut off as in the other construction. In the next position *e′*, the current, starting with the wire 87, passes in series through the series winding of the motor, the two armature windings 54′ and 86, one after the other, and through the resistance 48′, thus giving a slow speed. In the next position, *f′*, the path of the current is the same, with the exception that the right hand half of the resistance 48′ is cut out, thus giving slightly higher speed. In the next position, *g′*, all of the resistance is cut out, the path of the current being otherwise the same and passing in series through the two armature windings.

In the next position, *h′*, of the controller 4′, the current is divided at the point 88, and one part of it passes through the armature 54′, the series winding and the resistance 48′, while the other portion passes through the series winding, the armature winding 86 and the resistance 48′, thus giving a multiple arrangement and a higher speed than in the position *g′*. In the successive positions *i′* and *j′* the resistance 48′ is cut out, the right hand half of the resistance being eliminated in the position *i′*, and the other half in the position *j′*. The course of the current when the controller is in the positions as before recited will be readily understood without a detailed description, in view of the detailed description of Fig. 1, the principal difference in the controller being in the use of the contact plates 81, 82, 83, 84, and 85 arranged in two sets, as opposed to the more common arrangement as illustrated in Fig. 1.

What I claim is:

1. In combination in a mixed drive, a drive shaft, a compound wound motor dynamo having its armature in driving engagement with the drive shaft, an explosion engine, a clutch for connecting the engine with the drive shaft, a storage battery and switch in the dynamo motor series circuit, and a shifting member arranged to control the said circuit and the clutch, said shifting member in one position causing driving engagement of the clutch and leaving the circuit unbroken, and in another position throwing the clutch out of driving engagement but still leaving the circuit unbroken as in the first position, and in a third position maintaining the clutch out of engagement but shifting the direction of the current through the armature so that the motor dynamo runs backward.

2. In combination in a mixed drive for a vehicle, a drive shaft connected with the wheels of the vehicle, a compound wound motor dynamo having its armature in driving engagement with the drive shaft, an explosion engine, a clutch for connecting the engine with the drive shaft, a storage battery and switch in the dynamo motor series circuit, and a shifting member arranged to control the said circuit and the clutch, said shifting member in one position causing driving engagement of the clutch and leaving the circuit unbroken and under the control of the switch with the current from the battery driving the motor dynamo and the vehicle forward, and in another position throwing the clutch out of driving engagement and reversing the direction of current through the armature so that the motor dynamo runs backward driving the vehicle backward.

3. In combination in a mixed drive, a drive shaft, a compound wound dynamo having its armature in driving engagement with the drive shaft, an explosion engine, a clutch for connecting the engine with the drive shaft, a storage battery and switch in the dynamo motor series circuit, an electric igniter adapted to be operated from the battery, and a shifting member arranged to control the said circuit, the clutch and the application of current to the igniter, said shifting member in one position causing driving engagement of the clutch and leaving the motor dynamo circuit and igniter circuit unbroken, and in another position breaking the igniter circuit and throwing the clutch out of driving engagement, but still leaving the motor dynamo circuit unbroken as in the first position.

4. In combination in a mixed drive, a drive shaft, a compound wound motor dynamo having its armature in driving engagement with the drive shaft, an explosion engine, a clutch for connecting the engine with the drive shaft, a storage battery and switch in the dynamo motor series circuit, and a shifting member arranged to control the said circuit and the clutch, said shifting member in one position causing driving engagement of the clutch and leaving the circuit unbroken and under the control of the controller, in another position throwing the clutch out of driving engagement but still leaving the circuit unbroken as in the first position, and in a third position maintaining the clutch out of engagement but shifting the direction of the current through the armature so that the motor dynamo runs backward, and interlocking means whereby a shift from the second to the third position is prevented until the controller is moved to neutral position.

5. In combination in a mixed drive, a drive shaft, a compound wound motor dynamo having its armature in driving engagement with the drive shaft, an explosion engine, a clutch for connecting the engine with the drive shaft, a storage battery and switch in the dynamo motor series circuit, a shifting member arranged to control the said circuit and the clutch, said shifting member in one position causing driving engagement of the clutch and leaving the circuit unbroken and under the control of the controller, and in another position throwing the clutch out of driving engagement but still leaving the circuit unbroken as in the first position, and a second independently operable clutch in the drive between the said armature and the drive shaft.

6. In combination in a mixed drive, a drive shaft, a motor dynamo having its armature in driving engagement with the drive shaft, an explosion engine, a clutch for connecting the engine with the drive shaft, a storage battery, a manually operated member for closing the circuit of said motor and controlling the speed thereof, a second manually operated lever for closing together the members of said clutch to bring the engine and motor dynamo into rigid driving relation with one another, and mechanism requiring said latter lever to be moved to the position in which the said clutch members are out of engagement as a condition precedent to the operation of the motor dynamo in a reverse direction.

7. In a mixed drive for motor vehicles, the combination with a drive shaft connected with the wheels of a vehicle, a compound wound motor dynamo having its armature in driving engagement with the drive shaft, an internal combustion engine, a clutch for connecting the engine with the drive shaft, a storage battery, a main switch, an operating lever therefor adapted to include a resistance in the motor dynamo series circuit, the series turns on the field of said motor dynamo being of less normal effect than the shunt turns thereof whereby when the members of said clutch are closed and said motor dynamo is driven at a predetermined speed by said internal combustion engine, or when the motor dynamo is driven at a pre-determined speed by reason of the rapid descent of a grade the reversal of current in the series turns will be insufficient to overcome the magnetism of the shunt field turns and the motor dynamo will charge the storage battery, and a reversing switch for driving the motor in a reverse direction from said storage battery, together with means for preventing the connection of the members of said clutch when the reversing switch is thrown to the position for driving the motor in a reverse direction.

8. In a mixed drive for motor vehicles, the combination with a drive shaft connected with the wheels of the vehicle, a dynamo having its armature in driving engagement with the drive shaft, an internal combustion engine, a clutch for connecting the engine with the motor shaft and hence with the drive shaft, a storage battery, a manually shiftable member, a switch controlled thereby for reversing the connections between said dynamo and storage battery so as to propel the vehicle either in a forward or in a backward direction, said shiftable member in one position completing the ignition circuit for said engine and in the same position operating said clutch to unite the engine shaft with the motor shaft and in another position reversing the connections to said dynamo and separating the members of said clutch.

9. In a mixed drive for motor vehicles, the combination with a drive shaft connected with the wheels of the vehicle, a dynamo having its armature in driving engagement with the drive shaft, an internal combustion engine, a clutch for connecting the engine with the motor shaft and hence with the drive shaft, a storage battery, a manually shiftable member, a switch controlled thereby for reversing the connections between said dynamo and storage battery so as to propel the vehicle either in a forward or in a backward direction, said shiftable member in one position controlling said switch so as to drive the motor in a forward direction and closing the members of said clutch together and in another position moving said switch so as to propel the dynamo in a reverse direction and separating said clutch members.

In witness whereof, I hereunto subscribe my name this 14th day of January, A. D. 1916.

HARRY F. HITNER.

Witnesses:
BANNER M. ALLEN,
C. A. STEINHOFF.